(12) United States Patent
Naji

(10) Patent No.: US 7,204,065 B2
(45) Date of Patent: Apr. 17, 2007

(54) CEMENT RENDER SYSTEM

(75) Inventor: Basil Naji, Toongabbie (AU)

(73) Assignee: James Hardie International Finance B.V. (NL)

( * ) Notice: Subject to any disclaimer, the term of this patent is extended or adjusted under 35 U.S.C. 154(b) by 82 days.

(21) Appl. No.: 10/380,934

(22) PCT Filed: Sep. 19, 2001

(86) PCT No.: PCT/AU01/01176

§ 371 (c)(1),
(2), (4) Date: Aug. 18, 2003

(87) PCT Pub. No.: WO02/25034

PCT Pub. Date: Mar. 28, 2002

(65) Prior Publication Data
US 2004/0074184 A1 Apr. 22, 2004

(30) Foreign Application Priority Data
Sep. 19, 2000 (AU) .................................. PR 0223

(51) Int. Cl.
*E04C 2/26* (2006.01)
(52) U.S. Cl. .................. 52/741.1; 52/745.07
(58) Field of Classification Search ............. 52/741.41, 52/309.17, 337, 745.07
See application file for complete search history.

(56) References Cited

U.S. PATENT DOCUMENTS

| 2,104,869 | A | * | 1/1938 | Levy | 52/274 |
| 3,676,973 | A | * | 7/1972 | Kellert | 52/262 |
| 4,105,816 | A | * | 8/1978 | Hori | 428/159 |
| 4,125,981 | A | * | 11/1978 | MacLeod et al. | 52/309.12 |
| 4,131,474 | A | * | 12/1978 | Uchikawa et al. | 106/38.35 |
| 4,210,457 | A | | 7/1980 | Dodson et al. | |
| 4,252,767 | A | * | 2/1981 | Piazza et al. | 264/256 |
| 4,253,288 | A | * | 3/1981 | Chun | 52/454 |
| 4,292,775 | A | * | 10/1981 | Howard | 52/220.1 |

(Continued)

FOREIGN PATENT DOCUMENTS

AU 200016406 A1 8/2000

(Continued)

Primary Examiner—Basil Katcheves
(74) Attorney, Agent, or Firm—Gardere Wynne Sewell LLP

(57) ABSTRACT

A method for applying render to a substrate, said method including the steps of: securing a layer of confining mesh having a three-dimensional open cellular structure to the substrate; applying a base layer of cementitious material over the confining mesh; and screening the base layer to a depth at least substantially level with an outer surface of the confining mesh. Preferably, the method includes the further step of: applying a layer of reinforcing mesh over the base layer; and applying a top coat of cementitious material over the reinforcing mesh. A cementitious plaster formulation for use in the method as defined in the method according to any one of claims 1 to 25, said formulation including: 10% to around 40% cement by weight of total dry ingredients; 50% to around 85% sand by weight of total dry ingredients; 5% to around 40% fly ash by weight of total dry ingredients; an air entraining agent and a thickener respectively combined in a ratio of from 1:1 to around 120:1 and in a combined amount of between 0.01% and around 10% by weight based on the weight of the cement; and sufficient water to provide suitable fluidity.

27 Claims, 3 Drawing Sheets

U.S. PATENT DOCUMENTS

| | | | |
|---|---|---|---|
| 4,365,455 A * | 12/1982 | Braine | 52/745.07 |
| 4,797,026 A | 1/1989 | Webster | |
| 4,913,741 A | 4/1990 | Lane et al. | |
| 5,350,554 A * | 9/1994 | Miller | 264/171.11 |
| 6,119,422 A * | 9/2000 | Clear et al. | 52/309.8 |
| 6,251,178 B1 | 6/2001 | Styron | |
| 6,254,817 B1 * | 7/2001 | Cooper et al. | 264/171.13 |
| 6,488,792 B2 * | 12/2002 | Mathieu | 156/40 |
| 6,729,090 B2 * | 5/2004 | Messenger et al. | 52/309.12 |

FOREIGN PATENT DOCUMENTS

| | | |
|---|---|---|
| DE | 25 30 393 | 7/1975 |
| DE | 3206163 | 9/1983 |
| DE | 3926366 A1 | 2/1991 |
| EP | 0384898 | 2/1990 |
| EP | 0595171 | 10/1993 |
| EP | 0732464 A | 12/1994 |
| FR | 2 516 435 | 5/1983 |
| GB | 1522480 A | 8/1978 |
| GB | 2164328 | 9/1985 |
| GB | 2314114 | 6/1995 |
| JP | 054011931 A | 1/1979 |
| JP | 060141685 A | 7/1985 |
| JP | 04139080 A | 5/1992 |
| WO | WO 86/00291 A | 6/1984 |
| WO | 98/55712 | 6/1998 |
| WO | 01/42164 | 12/2000 |

* cited by examiner

CEMENT RENDER SYSTEM

FIELD OF THE INVENTION

The present invention relates to a method for applying render to a surface, and to a cementitious formulation for use in the method.

The invention has been developed primarily for use in the building industry, and more particularly in housing construction. The invention will therefore be described predominantly in this context. It will be appreciated, however, that the invention is not limited to this field of use.

BACKGROUND OF THE INVENTION

Various techniques for applying render to a substrate are known. One of the more common techniques used in housing construction is referred to as "stucco". This technique makes use of a flat wire reinforcing mesh to facilitate the building up of a solid cladding layer of cementitious plaster over a barking material, which is typically fixed to a light timber or steel frame. The cementitious plaster is usually applied either by hand, or more commonly in recent times by means of shot-crete spraying, in consecutive layers or coats, until the desired cumulative thickness has been achieved. This thickness is typically between 20 and 25 mm. The system has a number of advantages including that it can be formed in a variety of shapes around complex curves, it can be finished in a range of surface textures, and it can provide a solid uniform appearance with adequate impact resistance. However, the conventional stucco render system is also subject to a number of inherent disadvantages.

Firstly, in order to build the sprayed stucco plaster to the required thickness, it must be applied in a multiple of relatively thin layers so as to avoid sagging and wastage. This creates planes of weakness in the render system at the interfaces between the layers, which, if incorrectly applied and treated, can induce cracking, and bonding failures. In the past, this problem has been addressed by the application of a curing agent to the plaster composition. The curing agent is typically sprayed onto the surface of each layer as a film. Because of the water loss at the surface of the plaster, the curing agent must be applied within a relatively short time from when the plaster is sprayed, typically within 15 to 20 minutes. Then, before a further plaster layer can be added, the curing agent must be removed. Otherwise, it can prevent or impede adequate bonding between adjacent layers of the plaster composition. These steps all contribute to the material cost, the time involved, and the expertise required in order to implement the system effectively. The process is also highly specialised, and is susceptible to inconsistent application and operator error.

A further disadvantage is that stucco plaster normally comprises a mix of cement, sand and lime, which is difficult to pump and spray effectively by shot-creting as a wet mix. Accordingly, the operator is usually limited to the use of a day mix formulation. However, the application process then becomes heavily reliant upon the skill of the operator to estimate the appropriate level of water which must be added to the mix "on the fly", during spraying. This in turn introduces a significant potential for variability in the mix composition, which may influence its shrinkage and crack resistance characteristics, and may thereby adversely affect the durability of the render system.

In an attempt to address this problem, it is known to use modified cement and sand plaster mixes, which are designed to be applied using the more consistent wet mix shot-creting technique. However, such mixtures are difficult to use in high build (i.e. high depth) applications requiring a conventional sand and cement render finish. This is because the presence of modifying polymers in the mix makes it too runny to build to more than about 8 to 10 mm in thickness without the aid of an accelerator. Then, once applied, the accelerated mix becomes too sticky and hard to sponge finish. Consequently, additional decorative texture coatings are required in order to provide the desired sponge finished appearance, which adds further to the time and cost involved in the process overall.

Additional disadvantages include the fact that the conventional stucco system requires highly skilled plasterer in order to achieve a consistent high quality flat finish. Such operators are in limited supply, and are expensive. The system is also prone to shrinkage cracking and surface peeling, particularly when drying in exposed conditions. Furthermore, the system requires lengthy and hence costly waiting times between coats to enable each layer of plaster to hydrate and gain full strength. This requirement is often complicated and protracted by adverse weather conditions and limited site access, thereby further compromising the practical and commercial viability of the system in an increasingly competitive housing market.

It is an object of the present invention to overcome or ameliorate one or more of the disadvantages of the prior art, or at least to provide a useful alternative.

DISCLOSURE OF THE INVENTION

Accordingly, in a first aspect, the invention provides a method for applying render to a substrate, said method including the steps of:

securing a layer of confining mesh having a three-dimensional open cellular structure to the substrate;

applying a base layer of cementitious material over the confining mesh;

screeding the base layer to a depth at least substantially level with an outer surface of the confining mesh;

applying a layer of reinforcing mesh over the base layer; and applying a top coat of cementitious material over the reinforcing mesh.

Preferably, the confining mesh is formed from a plastics material, ideally a high density polyethylene plastic. In the preferred embodiment, the confining mesh is initially provided in a collapsed configuration and is selectively expandable prior to use into a three-dimensional open celled honeycomb structure, with the size of the cells being adjustably determined by the extent of expansion. The depth of the cellular structure is preferably between 5 mm and around 100 mm, more preferably between 10 mm and around 60 mm, and ideally between 15 mm and around 25 mm.

The cementitious material of the base layer is preferably applied by shot-crete spraying onto the confining mesh so as substantially to fill the cellular structure in a single application, and then screeded to a depth approximately level with the outer surface of the confining mesh. Preferably, upon drying, the cellular walls of the confining mesh act as expansion joints for the cementitious material to resist shrinkage cracking.

Preferably, the cementitious material for the base layer is formed from a polymer modified sand and cement plaster composition. Preferably, the plaster composition includes a combination of cement, sand, fly ash, at least one air entraining agent, at least one thickening agent, and sufficient water to provide suitable fluidity. Preferably, the air entraining agent and the thickener are combined respectively in a weight ratio of between 1:1 and 120:1, and in a combined amount of 0.01% to 10% by weight based on the weight of the cement.

Preferably, the reinforcing mesh is formed from glass fibre, which is preferably embedded in the surface of the base layer immediately after spraying.

Preferably, the top coat is formed from a cementitious material, substantially the same in composition as the base layer. The top coat is preferably also applied by spraying, preferably to a depth of between 1 mm and around 20 mm, more preferably between 2 mm and around 10 mm, and ideally between 4 mm and around 6 mm. The top coat is preferably screeded level and optionally sponge finished to provide a surface texture similar to conventional stucco render.

In the preferred embodiment, the method includes the further step of applying a relatively thin finishing layer over the top coat. Preferably, the finishing layer includes one, and ideally at least two coats of a high build acrylic membrane decorative paint. The paint may ideally be applied by brushing, rolling or spraying over the top coat.

According to a second aspect, the invention provides a cementitious plaster formulation for use in the method as described above, said formulation including:

10% to around 40% cement by weight of total dry ingredients;

50% to around 85% sand by weight of total dry ingredients;

5% to around 40% fly ash by weight of total dry ingredients;

an air entraining agent and a thickener respectively combined in a ratio of from 1:1 to around 120:1 and in a combined amount of between 0.01% and around 10% by weight based on the weight of the cement; and sufficient water to provide suitable fluidity.

Preferably, the proportion of cement in the composition is between 13% and around 35%, and ideally between 15% and around 30% by weight of the total dry ingredients.

Preferably also, the proportion of sand in the composition is between 60% and around 80%, and ideally between 65% and around 70% by weight, based on the total dry ingredients.

The proportion of fly ash comprising particles of less than 45 microns and greater than 10 microns in size in the composition is preferably between 5% and around 40%, more preferably between 10% and around 35%, and most preferably between 15% and around 30% by weight, based on the total dry ingredients.

The proportion of fly ash comprising particles of less than 10 microns in size in the composition is preferably between 1% and around 25%, more preferably between 5% and around 20% and most preferably between 10% and around 15% by weight, based on the total dry ingredients.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
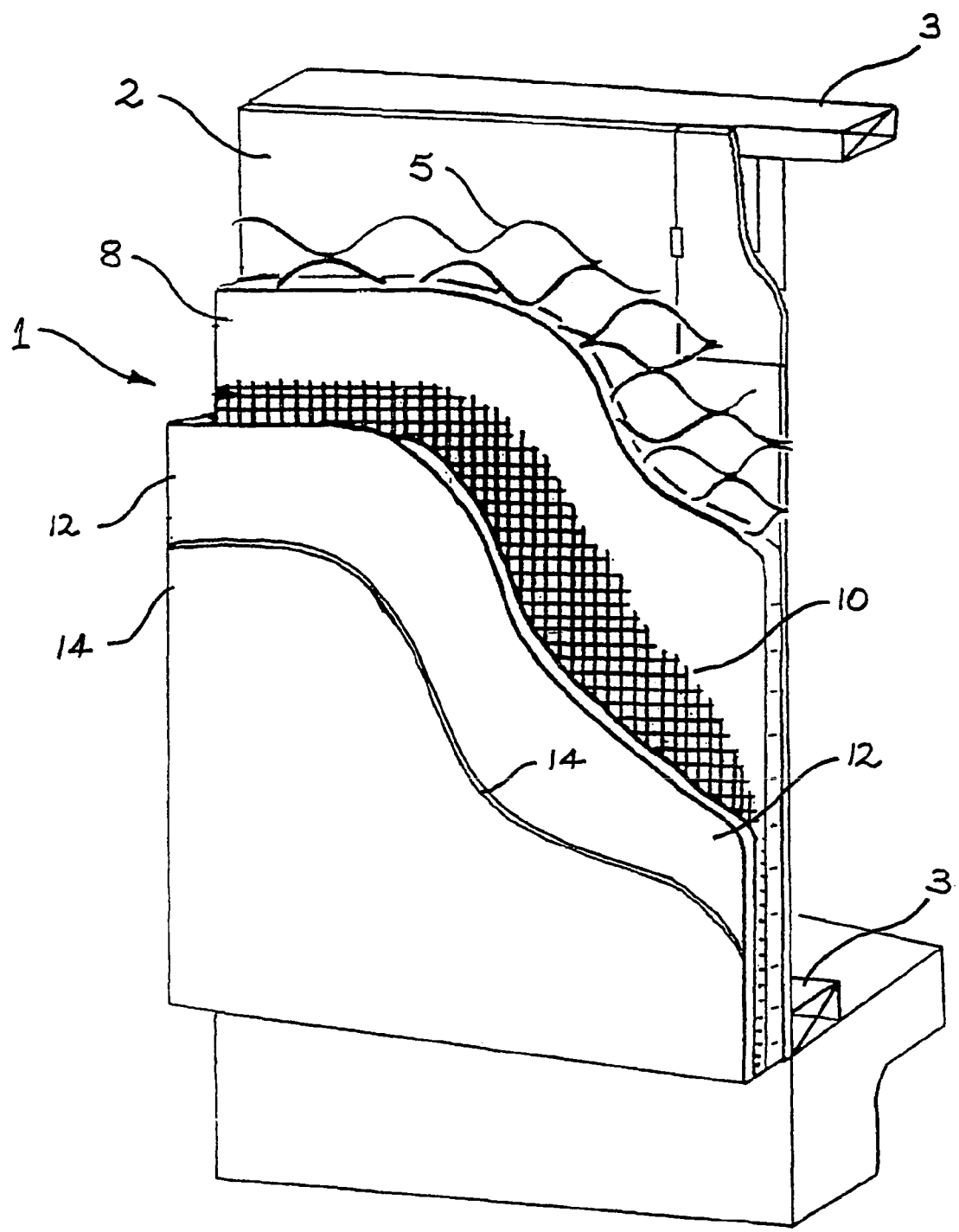
FIG. 1 is a cutaway perspective view showing a substrate rendered in accordance with the method of the present invention.

Referring to the drawings, the invention provides a method for applying render 1 to a substrate 2. In the context of housing construction, the substrate can be plywood, fibre insulating board, fibre reinforced cement (FRC) sheet, polystyrene, weatherboard, gyprock, brick, hollow core blocks, or other suitable rigid or semi-rigid materials, typically supported by a conventional timber or steel frame 3.

Figure 2:
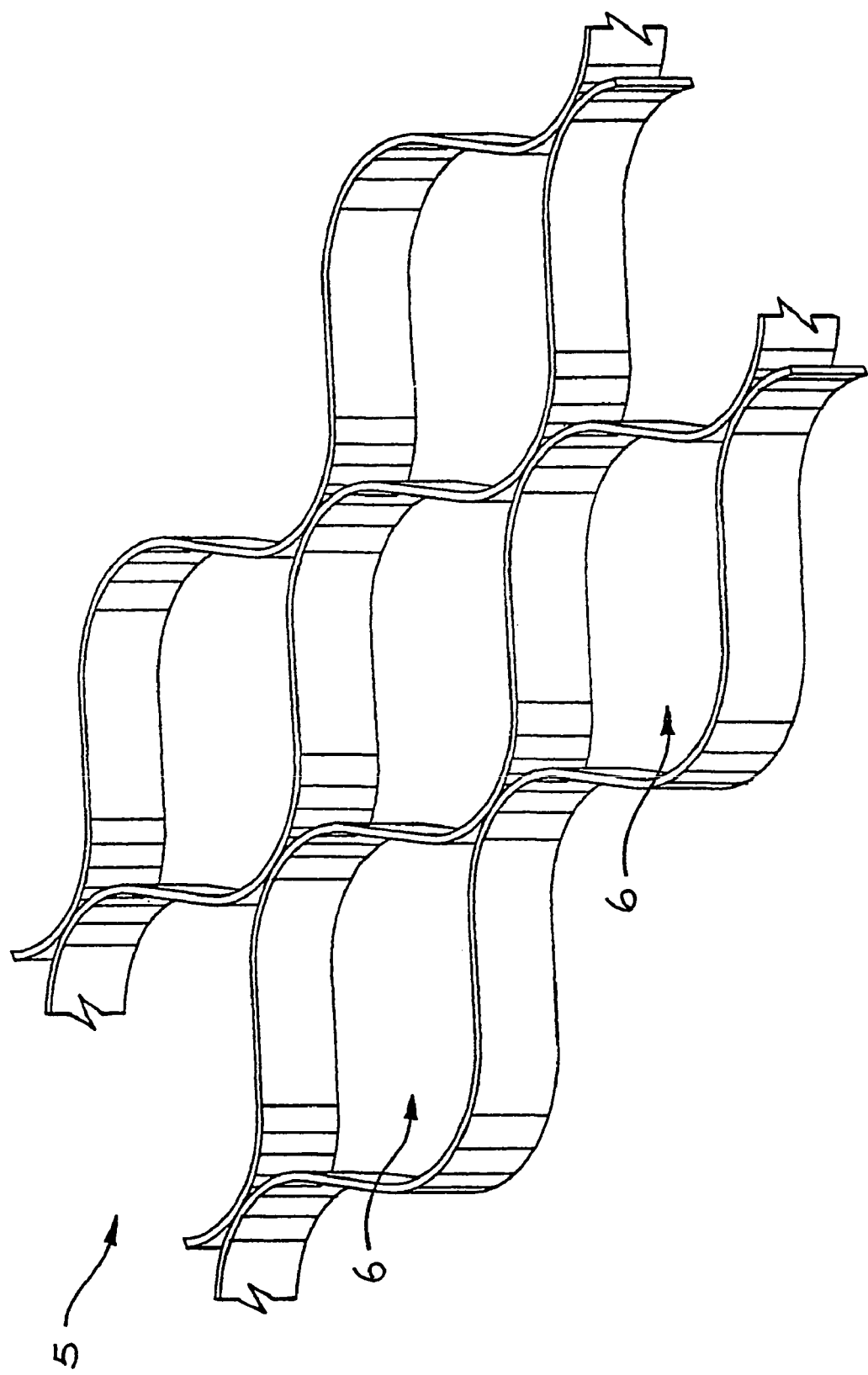
FIG. 2 is an enlarged perspective view showing the open cellular configuration of the confining mesh in the expanded configuration.
Figure 3:
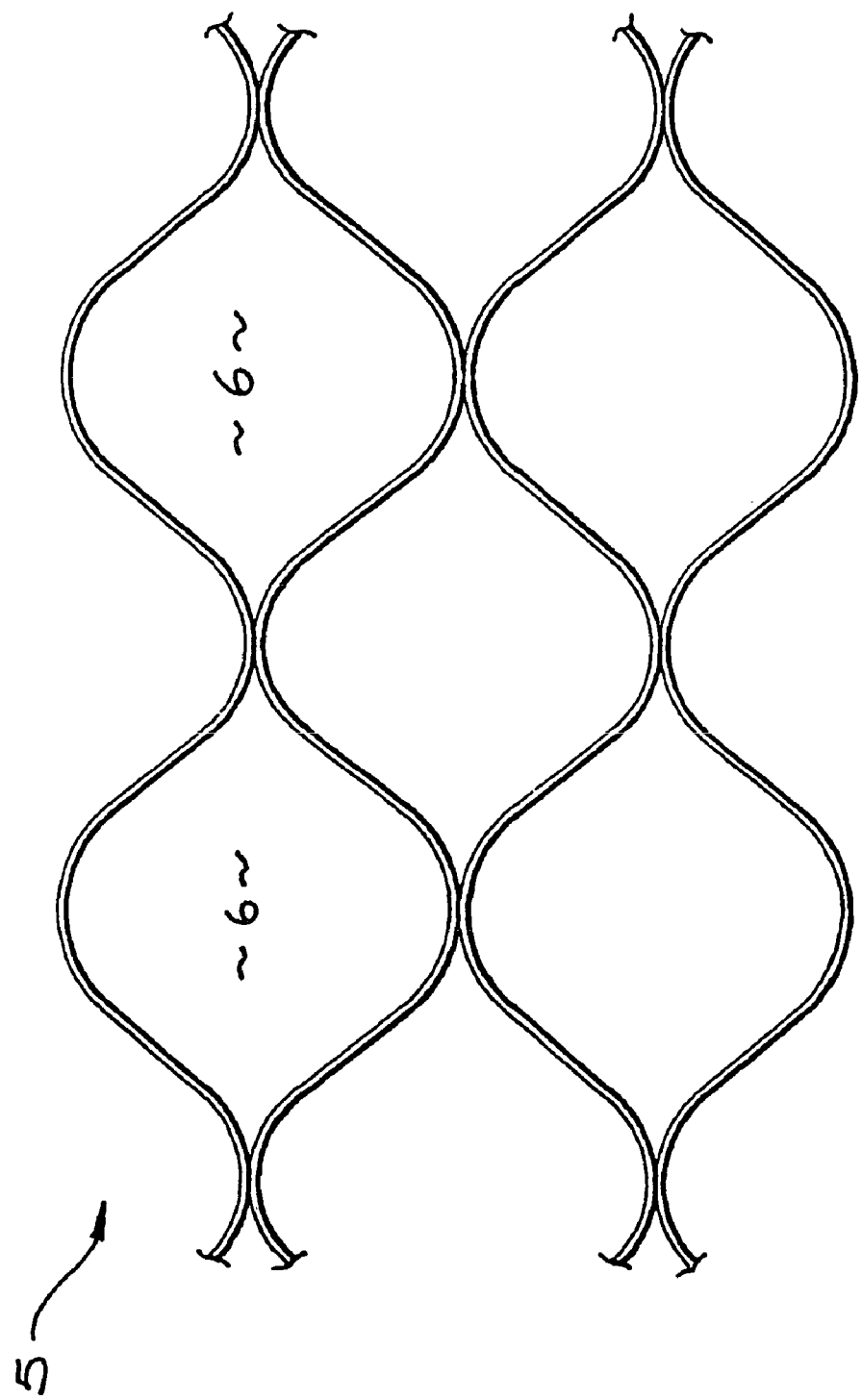
FIG. 3 is a plan view of the confining mesh in the expanded configuration.

The first step in the process involves the use of a layer of confining mesh 5, having an open, three-dimensional structure defining a series of discrete cellular compartments 6, in the nature of a coarse honeycomb structure. The mesh is formed from a plastics material, ideally a high density polyethylene (HDPE). It is initially provided in a collapsed configuration (not shown) which is selectively expanded prior to use into the three dimensional open celled structure illustrated (see FIGS. 2 and 3), with the size and shape of the cells being determined by the extent of biaxial expansion. The depth of the cellular structure is selected according to the architectural and structural nature of the building, the desired aesthetics, desired thermal and acoustic insulation characteristics, cost considerations, and other factors. Within these constraints, however, the depth is preferably between 5 mm and around 100 mm, more preferably between 10 mm and around 60 mm, and ideally between 15 mm and around 25 mm.

The mesh material is typically delivered to site in the form of collapsed strips 60 mm wide by 15 mm deep by 2400 mm long, which expand to form diamond shaped cells. With the mesh expanded to the desired extent, it is secured to the substrate by staples, tacks, screws, adhesive, or other suitable means. The preferred fastening technique involves the use of staples or nails. One example of a suitable material for the confining mesh is sold under the name EnviroGrid™, by AGH Industries, Inc., USA and is described in U.S. Pat. No. 4,797,026 although it should be understood that this material was designed and is conventionally used for an entirely different purpose, in the context of soil stabilisation. It should also be appreciated that any other suitable shape and form of mesh may be used. Furthermore, the mesh may be formed from other materials such as metal foil, timber, cardboard, paper, woven fabric, reinforced composites, or other suitable plastics materials. The mesh may also be applied in multiple layers, with each layer either being fastened to the underlying layer or supported directly from the substrate. In this case, the cell size, shape, configuration and material composition may vary between layers.

With the confining mesh in place, the next step in the process involves the application, of a base layer 8 of cementitious plaster material. The specific formulation of cementitious plaster will be described in more detail below. The cementitious composition is conveyed to the point of application by pumping, typically using a peristaltic or a mono pump, and is conveniently applied by spraying, using conventional wet shot-creting techniques, as a single layer so as to fill and substantially cover the confining mesh. During the process, the confining mesh prevents the cementitious plaster material from slumping, even at depths of 60 mm to 100 mm. The plaster is then screeded to a depth substantially level with or marginally covering the outer surface of the confining mesh.

In this way, the mesh segments and confines the cementitious plaster material of the base layer of into a large number of contiguous but discrete pockets. The mesh walls extending between the pockets effectively then provide expansion joints for the plaster contained within the pockets, which relieve stresses caused by shrinkage during the hydration and drying process. Consequently, the problems typically associated with shrinkage cracking are substantially ameliorated. At the same time, the interconnections between the cell walls provide reinforcing for the base layer to improve its structural integrity and impact resistance. If necessary, the cell walls may be formed with a roughened texture to improve bonding with the cementitious plaster of the base layer. Such roughening may be achieved, for example, by impregnating the plastics material of the mesh with a particulate material such as sand, adhering a particulate material such as sand to the exposed surfaces of the mesh, applying a surface primer, roughening the surface through abrasion or chemical etching, or by other suitable means.

The next step in the process involves the application of a layer of reinforcing mesh 10 over the top of the base layer. Ideally, the reinforcing mesh is formed from woven or chopped fibreglass matting and is embedded into the surface of the base layer while the cementitious material is still wet. Additionally, or as an alternative to this step, the cementitious plaster of the base layer can itself be impregnated with reinforcing fibres formed, for example, from steel, glass, polypropylene, cellulose, or other suitable materials.

The next step involves the application of a top coat 12 of cementitious material over the reinforcing mesh 10, such that the fibreglass reinforces the interface between the base layer and the top coat (see FIG. 1). The top coat is ideally formed from a cementitious material, which is substantially the same in composition as the base layer. It will be appreciated, however, that the material composition of the two layers need not be the same, provided they are sufficiently compatible to ensure adequate bond strength with each other and with the reinforcing mesh, at the interface. The top coat 12 is again applied by shot-crete spraying, preferably to a depth of between 1 mm and around 20 mm, more preferably between 2 mm and around 10 mm, and most preferably between 4 mm and around 6 mm. Once applied to the desired thickness, the top coat is screeded level and finished to the desired surface texture.

In one particularly preferred form of the invention, the top coat is trowelled and sponged to provide a surface which is similar in appearance and texture to conventional stucco render. In this way, the top coat is ready to paint, without the need for a supplementary texture coating. This is possible partly by virtue of the fact that the plaster composition (as described below) contains a significant volume of coarse sand fraction with a substantial proportion of particles being up to around 600 microns in size. Such particles are normally absent in conventional polymer modified renders designed for sprayed plaster applications, in which the sand fraction is normally composed substantially of silica flour, with particles averaging only around 30 microns in size.

The final step in the process involves the application of a finishing layer 14 over the top coat 12. The finishing layer ideally includes at least two coats of a high build acrylic membrane decorative paint, applied by brushing, rolling or spraying directly over the top coat. Alternatively, however, it will be appreciated that a wide variety of paints, membrane finishes or texture coatings, in a range of thicknesses and combinations, may be applied using numerous application and finishing techniques. Such materials and techniques are well known to those skilled in the art, and so will not be described in more detail.

Turning now to describe the plaster formulation in more detail, the cementitious material ideally includes a composition of cement, sand, fly ash, at least one air entraining agent, at least one thickening agent, and sufficient water to provide suitable fluidity. The air entraining agent and the thickener are respectively combined in a ratio of from 1:1 to 120:1 and in a combined amount of 0.01% to around 10% by weight, based on the weight of the cement.

The term "cement" in the context of this formulation is intended to include, but is not limited to: hydraulic and alite cements, such as Portland Cement; blended cements such as Portland Cement blended with fly ash, blast furnace slag, pozzolans, and the like, and mixtures thereof; masonry cement; oil well cement; natural cement; alumina cement; expansive cements, and the like, and mixtures thereof. The proportion of cement in the composition is preferably between 10% and around 40%, more preferably between 13% and around 35%, and ideally between 15% and around 30% by weight of the total dry ingredients.

Any type of sand that is commonly used in the building industry, may be used effectively in the context of this invention. Examples of suitable sands include ASTM 20/30 silica sands, dune sands, beach sands and job site sands. The proportion of sand in the composition is preferably between 50% and around 85%, more preferably between 60% and around 80%, and most preferably between 65% and around 70% by weight, based on the total dry ingredients.

The term "fly ash" generally refers to a solid powder having a chemical composition similar to or substantially the same as the composition of the material that is produced during the combustion of powdered coal. This material typically comprises from 25% to about 60% silica, from 10% to about 30% $AL_2O_3$, from 5% to about 25% $Fe_2O_3$, from 0% to about 20% CaO, and from 0% to about 5% MgO. Fly ash particles are typically spherical, ranging in diameter from 1 to 45 microns. In the cementitious composition, the proportion of fly ash comprising particles of less than 45 microns and greater than 10 microns in size is preferably between 5% and around 4% more preferably between 10% and around 35%, and most preferably between 15% and around 30% by weight, based on the total dry ingredients. The proportion of fly ash comprising particles of less than 110 microns in size in the composition is preferably between 1% and around 25%, more preferably between 5% and around 20% and most preferably between 10% and around 15% by weight, based on the total dry ingredients.

Typical air entraining agents (AEAs) suitable for use in the invention include: nonionic AEAs such as fatty alkanolamides, ethoxylated fatty amines, ethoxylated fatty acids, ethoxylated triglycerides, ethoxylated alkylphenols, ethoxylated alcohols, alkyl ethoxylates, alkylaryl ethoxylates; cationic AEAs such as amine ethoxylates and amine oxides; amphoteric AEAs such as betaines; and anionic AEAs such as fatty alkyl ether sulfates, fatty alkylaryl ether sulfates, alkyl benzene sulfonates, alpha-olefinic-sulfonic acids or salts thereof, sulfosuccinates, and fatty sulfonates. Suitable AEAs must ideally be soluble at a pH range of 3 to 6 in order to ensure solubility in the cementitious mixture, and must ideally also be soluble at a pH of 10 to 11 and above, in view of the hydration process taking place in the mortar. Accordingly, the AEA ideally has a relatively wide solubility range.

Thickening agents suitable for use in the invention include one or more polysaccharide plasticizers which can be further subdivided into cellulose based materials and derivatives thereof, starch based materials and derivatives thereof, and other polysaccharides. Suitable cellulose based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and for practical purposes need not be listed. Nevertheless, it will be appreciated that many other cellulose materials have essentially the same or similar properties as those mentioned and are equivalent for the present purposes. Suitable starch based materials include, for example, amylopectin, amylose, sea-gel, starch acetates, starch hydroxyethyl ethers, ionic starches, long-chain alkylstarches, dextrins, amine starches, phosphate starches, and dialdehyde starches. Other natural polysaccharide based rheology-modifying agents include, for example, alginic acid, phycocolloids, agar, gum arabic, guar gum, welan gum, locust bean gum, gum karaya, and gum tragacanth.

Normally, polymer modified cement/sand plaster compositions are subject to a number of inherent limitations which restrict the manner in which they can be used. Firstly, due to the presence of polymers needed to provide pumpability, sprayability and adherence to a backing material, the mix becomes too sticky and saggy if used in high build render applications (i.e. greater than around 10 mm in thickness). Therefore, a number of thin layers are usually required in order to achieve the desired cumulative build thickness. Another reason for the relatively thin application is the need to control the setting time which is heavily retarded due to the presence of organic polymers in the modified mix. In addition, sand or silica flour (with a maximum size fraction less than 250 microns) is normally used in the plaster composition, rendering the mix low in the 300 to 600 micron coarse sand fraction needed to provide the appearance of a conventional sponge finish.

Surprisingly, the polymer modified mix composition of the present invention as described above exhibits an ability to set (i.e. reach firmness) within 90 minutes of application, even in high build render situations. Furthermore, it is comparable in pumpability and sprayability to conventional polymer modified plaster compositions, while exhibiting an ability to be sponge finished for an appearance similar to conventional sand/cement plasters and stucco renders.

Confining meshes of the type described are known, but have typically only been used for soil reinforcement and stabilisation. They have not hitherto been used in the context of cement rendering. This is firstly due to the relatively poor adhesion between cementitious plasters and high density polyethylenes and similar materials, and secondly because of the expected mismatch between the movement of the two materials when exposed to external environmental conditions. Surprisingly, however, it has been found that the use of this mesh in the context of the present invention has resulted in a peel free and substantially crack resistant render system, due to the synergistic interaction between the cementitious render of the base layer and the confining mesh. Again unexpectedly, this compatibility has been achieved in part by embedding a layer of fibreglass reinforcing mesh over the plaster filled pockets of the confining mesh.

Overall, the invention therefore provides a number of unexpected advantages over conventional stucco and other rendering techniques. It enables a relatively high build or thickness of render to be achieved in a single base coat, without the need for multiple layers and without slumping. It thus eliminates the waiting time between layers as well as the need to apply a curing agent between layers to ensure adequate bonding. Additionally, the technique of spraying and screeding, in place of hand plastering, means the application process is less specialised and does not require operators to be skilled to the same degree. It is also more consistent and less susceptible to operator error.

The system is not limited to the conventional stucco thickness of around 20 mm. Rather, a base layer with a thickness of more than 50 mm and up to 100 mm can be achieved simply by varying the depth of the confining mesh. This particular feature enables the formation of a thick-clad render system that is applicable to virtually any surface and yet is comparable to masonry in terms of feel, solidity, impact resistance and durability.

Because of the synergistic interaction between the mesh and the cementitious material of the base layer, there is improved resistance to shrinkage cracking and surface peeling during drying, which ultimately improves the strength and longevity of the render system. At the same time, the system provides a finished top coat which is ready to paint without the need for additional layers of surface texture material.

The system is comparable in pumpability and sprayability with known polymer modified plaster compositions, yet sets quickly even in high build render situations, and allows sponge finishing to a texture similar to conventional stucco render, which is highly desirable in certain segments of the market.

The system may be used over substrates of concrete, masonry, core filled sandwich walling, or other structural materials to improve aesthetics, thermal and acoustic insulation, weatherproofing, strength, and durability. It may also be applied to semi-rigid backing materials such as plywood, cellulose fibre insulating board, fibre reinforced cement board, polystyrene, plasterboard, or other cladding materials as a masonry substitute for improved solidity, strength, insulation and aesthetics.

The application of the present invention in the building industry is thus far reaching and wide ranging, not just as an alternative render system, but as an alternative method of building construction. In all these respects, the invention represents a practical and commercially significant improvement over the prior art.

Although the invention has been described with reference to specific examples, it will be appreciated by those skilled in the art that the invention may be embodied in many other forms.

What is claimed is:

1. A method for applying render to a substrate, said method including the sequential steps of:
   securing permanently a layer of confining mesh having a three-dimensional open cellular structure to the substrate;
   applying a base layer of cementitious material over the confining mesh such that the cementitious material substantially fills the open cellular structure and is substantially supported by the open cellular structure;
   screeding the base layer to a depth substantially level with an outer surface of the confining mesh;
   applying a layer of reinforcing mesh over the base layer; and
   applying a top coat of cementitious material over the reinforcing mesh.

2. A method according to claim 1, wherein the confining mesh is formed from a plastics material.

3. A method according to claim 2, wherein the plastics material consists substantially of a high density polyethylene plastic.

4. A method according to claim 1, wherein the confining mesh is initially provided in a collapsed configuration and is selectively expandable prior to use into a three-dimensional open cellular honeycomb structure, with the size of the cells being adjustably determined by the extent of expansion.

5. A method according to claim 4, wherein the depth of the cellular structure is between 5 nm and around 100 mm.

6. A method according to claim 5 wherein the depth of the cellular structure is between 10 mm and around 60 mm.

7. A method according to claim 6, wherein the depth of the cellular structure is between 15 mm and around 25 mm.

8. A method according to claim 1, including the additional step of applying the cementitious material of the base layer by shot-crete spraying onto the confining mesh so as substantially to fill the cellular structure in a single application, and subsequently screeding the cementitious material to a depth approximately level with the outer surface of the confining mesh.

9. A method according to claim 1, wherein the confining mesh is composed and configured such that, during drying, the cellular walls act as expansion joints for the cementitious material to resist shrinkage cracking.

10. A method according to claim 1, wherein the cementitious material for the base layer is formed from a polymer modified sand and cement plaster composition.

11. A method according to claim 10, wherein the plaster composition includes a combination of cement, sand, fly ash, at least one air entraining agent, at least one thickening agent, and sufficient water to provide suitable fluidity.

12. A method according to claim 11, wherein the air entraining agent and the thickener are combined respectively in a weight ratio of between 1:1 and around 120:1, and in a combined amount of between 0.01% and around 10% by weight based on the weight of the cement component.

13. A method according claim 1, wherein the reinforcing mesh is formed from glass fibre.

14. A method according to claim 1, including the further step of embedding the reinforcing mesh in the surface of the base layer immediately after application of the base layer.

15. A method according to claim 1, wherein the top coat is formed from a cementitious material, substantially the same in composition as the base layer.

16. A method according to claim 1, wherein the top coat is applied by spraying.

17. A method according to claim 1, wherein the top coat is applied to a depth of between 1 mm and around 20 mm.

18. A method according to claim 17, wherein the top coat is applied to a depth of between 2 mm and around 10 mm.

19. A method according to claim 18, wherein the top coat is applied to a depth of between 4 mm and around 6 mm.

20. A method according to claim 1, including the further step of screeding the top coat substantially level following the initial application.

21. A method according to claim 20, including the further step of sponge finishing the top coat after screeding to provide a surface texture similar to conventional stucco render.

22. A method according to claim 1, including the further step of applying a relatively thin finishing layer over the top coat.

23. A method according to claim 22, wherein the finishing layer includes at least one coat of a decorative paint.

24. A method according to claim 23, wherein the finishing layer is formed from a high build acrylic membrane paint.

25. A method according to claim 1, wherein the cementitious material includes a cementitious plaster formulation comprising:
 10% to around 40% cement by weight of total dry ingredients;
 50% to around 85% sand by weight of total dry ingredients;
 5% to around 40% fly ash by weight of total dry ingredients;
 an air entraining agent and a thickener respectively combined in a ratio of from 1:1 to around 120:1 and in a combined amount of between 0.01% and around 10% by weight based on the weight of the cement; and
 sufficient water to provide suitable fluidity.

26. A method according to claim 1, wherein the cementitious material substantially fills the open cellular structure and the cementitious material is substantially supported by the open cellular structure.

27. A method according to claim 1, wherein the base layer is screeded to a depth substantially level with an outer surface of the confining mesh.

* * * * *